United States Patent [19]

Kronenberg

[11] Patent Number: 4,602,425

[45] Date of Patent: Jul. 29, 1986

[54] METHOD OF PROTECTING A RADIOCHROMIC OPTICAL WAVEGUIDE DOSIMETER FROM ADVERSE TEMPERATURE EFFECTS

[75] Inventor: Stanley Kronenberg, Skillman, N.J.

[73] Assignee: The United States of America as represented by the Secretary of the Army, Washington, D.C.

[21] Appl. No.: 780,347

[22] Filed: Sep. 26, 1985

[51] Int. Cl.⁴ .................................................. H01P 11/00
[52] U.S. Cl. ................................. 29/600; 350/96.32
[58] Field of Search ................... 29/600; 250/474.1; 350/96.32

[56] References Cited

U.S. PATENT DOCUMENTS

| | | |
|---|---|---|
| 3,812,578 | 5/1979 | Prinzhorn .................... 29/600 |
| 3,812,765 | 6/1974 | Prinzhorn et al. .............. 29/600 |
| 4,377,751 | 3/1983 | Kronenberg et al. |
| 4,489,240 | 12/1984 | Kronenberg et al. |

FOREIGN PATENT DOCUMENTS

| | | | |
|---|---|---|---|
| 855919 | 11/1970 | Canada ............................ 29/600 |
| 1297722 | 6/1969 | Fed. Rep. of Germany ........ 29/600 |
| 1197080 | 7/1970 | United Kingdom .................. 29/600 |

*Primary Examiner*—Howard N. Goldberg
*Assistant Examiner*—Carl J. Arbes
*Attorney, Agent, or Firm*—Anthony T. Lane; Jeremiah G. Murray; Roy E. Gordon

[57] ABSTRACT

A radiochromic optical waveguide dosimeter is protected from the adverse temperature effects of exposure in the desired operational temperature range of −40° C. to +60° C. by flattening the round plastic tubing to be used for the fabrication of the dosimeter until the tubing attains an elliptical cross section and then fabricating the dosimeter from the tubing having the elliptical cross section.

3 Claims, No Drawings

METHOD OF PROTECTING A RADIOCHROMIC OPTICAL WAVEGUIDE DOSIMETER FROM ADVERSE TEMPERATURE EFFECTS

The invention described herein may be manufactured, used and licensed by or for the Government for governmental purposes without the payment to me of any royalty thereon.

This invention relates to a method of protecting a radiochromic optical waveguide dosimeter from adverse temperature effects.

BACKGROUND OF THE INVENTION

"Radiochromic optical waveguide dosimeters" refers to those nuclear radiation dosimeters characterized by gamma ray and neutron reduced changes in transmittance to visible light. The radiochromic optical waveguide dosimeters are used in miniaturized tactical dosimeters, civil defense instruments, and for industrial nuclear radiation dose measurements. These dosimeters are typically described and claimed in U.S. Pat. Nos. 4,489,240, issued Dec. 18, 1984 and 4,377,751, issued Mar. 22, 1983. These dosimeters however, suffer seriously from temperature effects. That is, exposure to elevated temperatures in the desired operational temperature range of $-40°$ C. to $+60°$ C. damages these dosimeters permanently by creating gas bubbles in their liquid or semiliquid cores. The reason for this is the fact that the core has a much higher thermal expansion coefficient than the plastic wall or cladding. Exposure to elevated temperature creates a high pressure inside the waveguides, forces some of the liquid core past the termination made of glass beads or glass rods or pushes the terminations out. After cooling, a low pressure occurs in the waveguide. The air is sucked in from the outside or sometimes the gas dissolved in the core forms a gaseous bubble which cannot be later removed.

SUMMARY OF THE INVENTION

The object of this invention is to provide a method of protecting a radiochromic fiber waveguide dosimeter from the adverse temperature effects in the desired operational temperature range of $-40°$ C. to $+60°$ C.

It has now been found that the aforementioned object can be attained by flattening the round plastic tubing to be used for the fabrication of the dosimeter until the tubing attains an elliptical cross section and then fabricating the dosimeter from the tubing having the elliptical cross section.

DESCRIPTION OF THE PREFERRED EMBODIMENT

Before using the round plastic tubing for the fabrication of the dosimeter, it is flattened somewhat. This can conveniently be accomplished by compressing it in a press or by running it through a rolling mill. The deformed tubing recovers partially but it has no longer a circular cross section but an elliptical cross section. After the dosimeter is fabricated from such tubing, the adverse temperature effect disappears. When heated, the core has space for expansion by changing the cross section of the cladding from elliptical into a cross section which is closer to being circular. A typical deformation that has been found to be suitable for round tubing such as FEP tubing having a diameter of 0.25 cm and a wall thickness of 0.05 cm is a ratio between the major axis and minor axis of the resulting ellipse of 1.6.

When samples of waveguides are made by the above described method, test results show that the ambient temperature problem is overcome. The deformation of the cross section of the waveguide into an elliptical shape does not adversely affect its optical parameters.

I wish it to be understood that I do not desire to be limited to the exact details as described for obvious modifications will occur to a person skilled in the art.

What is claimed is:

1. In a method of protecting a radiochromic optical waveguide dosimeter including a round plastic tube containing a solution of a radiochromic dye which is sensitive to ionizing radiation where the temperature expansion coefficient of the liquid core is much greater than the temperature expansion coefficient of the plastic cladding from the adverse temperature effects of exposure in the desired operational temperature range of $-40°$ C. to $+60°$ C., the improvement comprising flattening the round plastic tubing to be used for the fabrication of the dosimeter until the tubing attains an elliptical cross section and then fabricating the dosimeter from the tubing having the elliptical cross section.

2. Method according to claim 1 wherein the round plastic tubing is flattened by compression.

3. Method according to claim 1 wherein the round plastic tubing is flattened by running it through a rolling mill.

* * * * *